May 20, 1924.
C. O. KENNEDY
MILKING MACHINE
Filed May 6, 1920
1,494,553
3 Sheets-Sheet 1
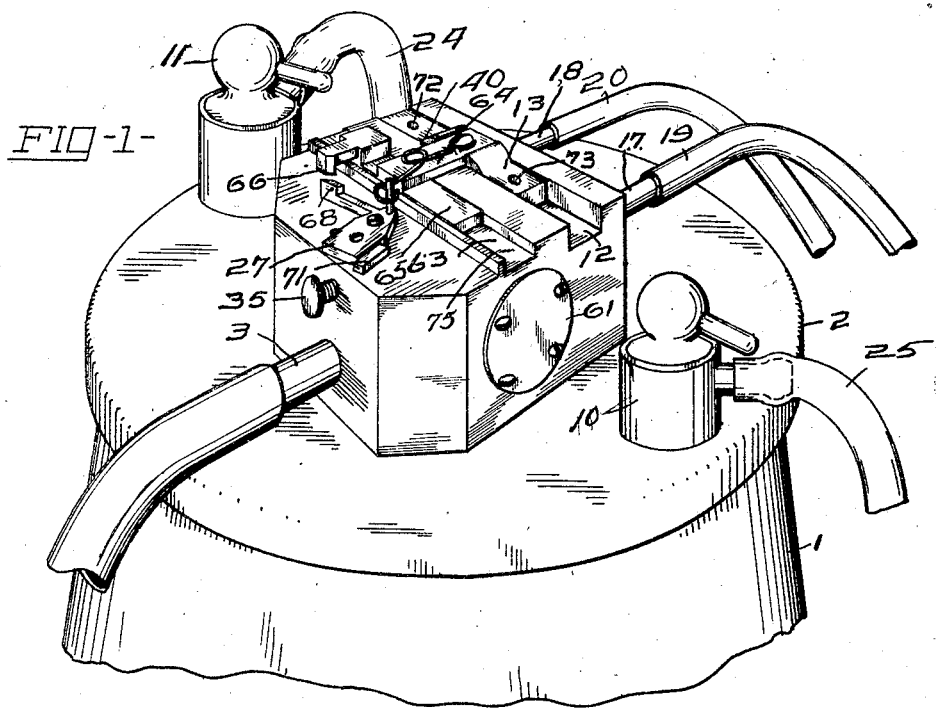
FIG-1-
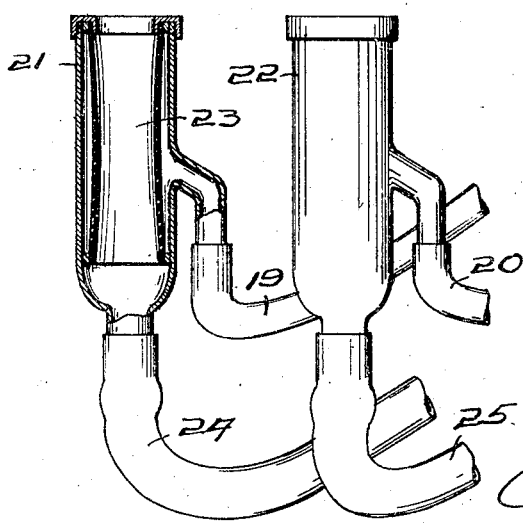
FIG-2-
INVENTOR
Charles O. Kennedy,
by
Owen, Owen & Crampton

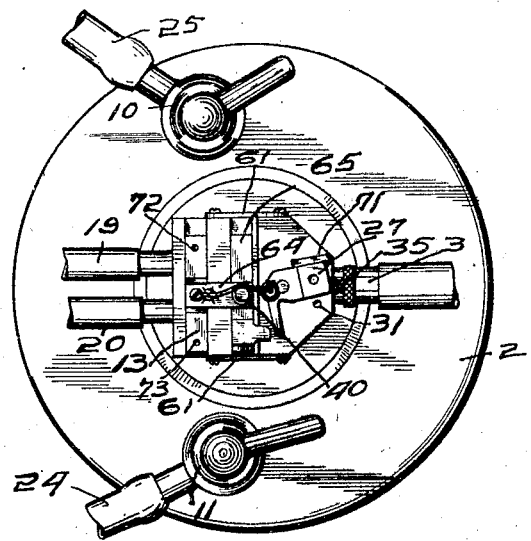

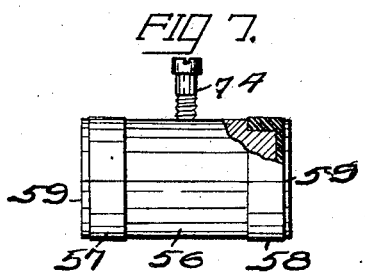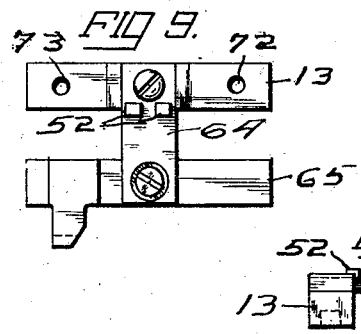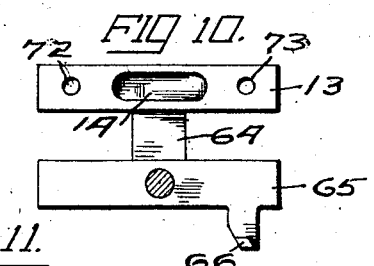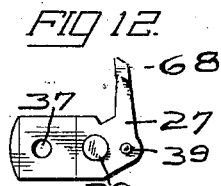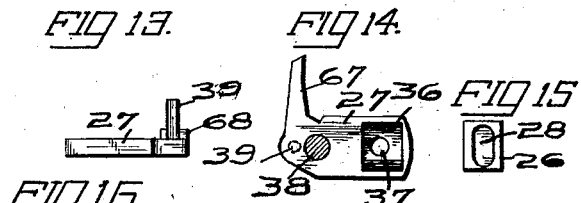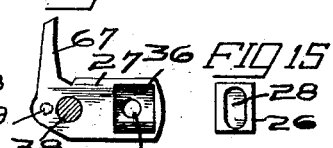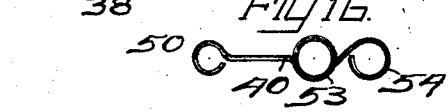

Patented May 20, 1924.

1,494,553

UNITED STATES PATENT OFFICE.

CHARLES O. KENNEDY, OF TOLEDO, OHIO.

MILKING MACHINE.

Application filed May 6, 1920. Serial No. 379,224.

*To all whom it may concern:*

Be it known that I, CHARLES O. KENNEDY, a citizen of the United States, and a resident of Toledo, in the county of Lucas and State of Ohio, have made an invention appertaining to a Milking Machine; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

My invention has for its object to provide in a milking machine a means whereby the massaging operation may be so controlled as to produce the most beneficial and efficient results. By my invention is provided a means whereby the periods of compression and releasement may be controlled and made uniform in length and also whereby the proper rate of the alternations may be maintained to produce the most effective results. Other advantages and features of my invention will appear from the following description and upon examination of the drawings.

The invention may be contained in milking machines of different forms. To illustrate a practical application of the invention I have selected a milking machine and shall describe it hereinafter. The milking machine selected is illustrated in the accompanying drawings.

Figure 1 of the drawings is a perspective view of the controlling mechanism of the machine and the can for receiving the milk. Fig. 2 illustrates a pair of teat-cups that may be connected to the controlling mechanism of the machine and to two different cows. Fig. 3 is a top view of the cover of the can shown in Fig. 1 and a top view of the controlling mechanism. Fig. 4 is a sectional view taken on the line 4—4 indicated in Fig. 5 and shows the valve mechanism in section. Fig. 5 illustrates a broken view of the frame, the valve mechanism being shown removed. Fig. 6 is a sectional view taken on the line 6—6 indicated in Fig. 5. Fig. 7 illustrates a doubleheaded piston used for operating a valve. Fig. 8 is an end view of the piston shown in Fig. 7. Fig. 9 is a controlling slide valve for controlling the vacuum to the teat branches. Fig. 10 is a bottom view of the slide valve shown in Fig. 9. Fig. 11 is an end view of the slide valve shown in Figs. 9 and 10. Figs. 12, 13 and 14 illustrate, respectively, top, side and bottom views of the means for operating the valve that controls the movement of the piston shown in Fig. 7. Fig. 15 illustrates the valve operated by the device illustrated in Figs. 12, 13 and 14. Fig. 16 illustrates the spring for actuating the device illustrated in Figs. 12, 13 and 14.

1, Fig. 1, is the milk pail which is provided with a cover 2. The cover 2 may be sealed or secured upon the pail 1 in any suitable way. Ordinarily the cover 2 is provided with a washer of suitable resilient material which will prevent air from entering the pail and thus the cover will be pressed upon the pail by the difference of the pressure produced within the pail and that of the atmosphere. An air pump is connected with the pipe 3 to reduce the pressure within the pipe 3. The air pump may be loosely termed a source of vacuum supply, meaning thereby, that it draws air from the mechanism illustrated and the mechanism may be said to be operated by the vacuum produced, although it is, as a matter of fact, operated by the atmospheric pressure when it exceeds the pressure produced in any of the parts of the apparatus by the air pump. For convenience of description the former terms are used with this understanding.

The pipe 3 is connected to a frame or block 4, provided with the passageway 5. A check valve casing 6 communicates with the passageway 5 and extends through the cover 2. A ball 7 may be used to operate as a check or one-way valve and permits air to pass out from the pail into the chamber or passageway 5 through the hole 8 formed in the check valve casing 6. The movement of the ball 7 is limited by the cross bar 9 and by its seat at the lower end of the valve casing 6. This produces and maintains the same pressure within the pail or receptacle 1 that is produced in the passageway 5 by the vacuum pump and thus causes the movement of the milk into the pail, through the valves 10 and 11 as hereinafter described.

The check valve casing is provided with a flange or shoulder which may be made in the form of a "hex." The casing extends through the cover 2 and the frame or block 4 may be secured to the cover by merely tightening the threaded casing.

The passageway 5 extends upward in the block 4 to a channel 12 in which is located a part of a slide valve 13 which fits the channel 12. The slide valve 13 is provided with a short channel 14, while the block or frame 4 is provided with a pair of passageways 15 and 16 that extend downward from the channel 12 and outward and communicating with the tubes 17 and 18. The passageways 15 and 16 terminate in the channel 12 and are located on opposite sides of the passageway 5. The channel 14 of the sliding valve 13 is of a length sufficient to cover two of the ends or openings formed by the passageways 5, 15 and 16. The sliding valve 13 may thus establish a communication between the passageways 5 and 16 on the one hand, or the passageways 5 and 15 on the other, according to the position taken by the sliding valve. By this arrangement the vacuum connection is established either between the pipes 3 and 17 or the pipes 3 and 18.

The sliding valve 13 is also provided with two openings 72 and 73 which are so positioned with reference to the passageways 15 and 16 that when communication is established between the passageways 5 and 15, the opening 73 will register with the passageway 16 and thus the vacuum produced in the pipe 18 will be at once reduced, that is to say, the pressure in the pipe 18 will immediately rise to atmospheric pressure. The same takes place with reference to the pipe 17 when communication is established between the passageways 5 and 16 and the opening 72 registers with the opening 15. By this means the pipes 17 and 18 are alternately reduced to the pressure produced by the vacuum pump and raised to atmospheric pressure.

The pipes 17 and 18 are connected by means of tubes 19 and 20 to the teat-cups 21 and 22 for manipulating the flexible tubing or massaging means 23 contained in each of the cups and mounted in the manner well known in the art. The teat-cups 21 and 22 may be connected to two different branches, that is to say, each teat-cup may be associated with four or five other teat-cups and thus the sets of teat-cups may be used for milking two cows. The teat-cups 21 and 22 shown in Fig. 2 represent the two sets of teat-cups which, however, forms no part of my invention. The bottoms or lower ends of the teat-cups 21 and 22 are connected by means of the pipes 24 and 25 to the valves 10 and 11 which permit communication between the interior of the pail with the teat-cups.

When the valves 10 and 11 are open, the vacuum produced by the vacuum pump operating through the check valve produces a similar low pressure at the lower ends of the teat-cups, the same operating through the pipes 24 and 25. When, therefore, the vacuum pump operating through the slide valve 13 to subject the pipes 19 and 20 alternately to a vacuus condition, and atmospheric pressure upon the flexible member 23 of the teat-cup is alternately reduced to the pressure produced through the pipe 24 or pipe 25 or is raised to near atmospheric pressure, which causes the flexible member 23 to alternately squeeze or massage and release the teat of the cow. This causes the milk to flow into the pipes 24 and 25 and to be drawn into the pail through the valves 10 and 11. The movement of the slide valve 13 is so controlled as to massage the teat with great regularity and yet with proper intervals between the alternate pressures and releasement on the teat. The movement of the sliding valve 13 is controlled by the cooperation of the sliding valve 26 and the piston 56.

The sliding valve 26 is located between the top of the block 4 and a recessed oscillating member 27. The sliding valve 26 is provided with a channel or recess 28 which may extend over either the openings 29 and 30 or the openings 30 and 31. The openings extend downward from the top of the block 4. The openings 29 and 31 communicate with openings 32 and 33 that extend to the end of the cylindrical opening 34. The opening 30 extends downward to the passageway 5. The movement of the air through the opening 30 is controlled by the needle valve 35 which may be adjusted so as to vary the movement of the air through the opening 30 and thus vary the movement of the air through the openings 29, 31, 32 and 33, since communication between the opening 30 and the last named opening are alternately established by the sliding valve 26. The sliding valve 26 is located in a recess 36 formed on the under side of the oscillating member 27. The recess 36 communicates with the upper side of the oscillating member by means of the opening 37. The sliding member 26 is thus held against the top of the block 4 by means of the atmospheric pressure, the interior of the recess 28 being subject to the vacuum produced by the vacuum pump and operating through the opening 30 which communicates with the chamber or passageway 5.

The oscillating member 27 lies on the top of the block 4 and is pivoted by means of the pin 38 to the block 4. It has a pin 39 that extends upward from the oscillating member and a spring 40 having one end 50 secured by means of a screw 51 and by means of the lugs 52 to the sliding valve 13 operates the oscillating member 27. The lugs 52 are located on opposite sides of the shank of the spring and thus hold that end of the spring in a definite relation with respect to the sliding valve 13. The spring is provided preferably with a coil 53 which gives it flexibility and with a loop 54 that surrounds the end of the pin 39. As the sliding valve moves back and forth it carries with it the spring 40 and the looped end of the spring operates on the pin 39 to cause the oscillating member 27 to swing back and forth on the pivot pin 38. This causes the sliding valve 26 to alternately cover and expose the openings 29 and 31 and when either of the openings is covered, communication is established with the opening 30 which alternately subjects the passageways 32 and 33 to the vacuous condition produced by the vacuum pump and to atmospheric pressure. This in turn operates the piston 56.

The piston 56 is a double headed piston, having the flexible caps 57 and 58 secured by washers 59 and screws 60. The piston 56 is located in the cylindrical opening 34, the ends of which communicate with the passageways 29 and 31 through the passageways 32 and 33. The ends of the cylindrical opening 34 are closed by plates 61. A slot 62 extends from a chamber 63 formed in the top of the block 4 in parallel relation to the channel 12. A screw 74 is secured to the piston and extends up through the slot 62. The screw is connected to the sliding valve 13 by means of the cross bar 64 which connects together the sliding valve 13 and guiding member 65, the first being located in the channel 12 and the second being located in the channel 63. The piston operates through the screw to shift the sliding valve 13 back and forth as the piston 56 is operated back and forth by the pressure of the atmosphere produced alternately in opposite ends of the cylindrical opening 34 by the shifting of the slide valve 26 as it moves to cover first the openings 29 and 30 and then the openings 30 and 31 and to alternately expose the openings 29 and 31 to the pressure of the atmosphere.

The movement of the sliding valve 26 is so limited that it moves only as the piston 56 leaves the end of each of its strokes. The end of the bar 65 is provided with a downwardly extending lug 66 while the oscillating member 27 is provided with an arm 67 that has an upwardly extending lug 68. The lugs 66 and 68 are preferably diamond-shaped, and so as to engage each other except at the termination of the strokes of the piston 56. When the cylinder has completed a stroke and carried with it the spring 40 which swings the oscillating member to its extreme position, that is, so that the sliding valve 26 will cover the openings 29 and 30 and expose the opening 31, the lug 66 will engage the lug 68 and hold it on the outside of the lug 66 and so as to hold the sliding valve 26 in the position such that it covers the openings 29 and 30 and exposes the openings 31 to the atmosphere. The atmospheric pressure will force the piston to the other end of cylindrical opening 34, whereupon the lug 66 will pass the lug 68 and thus release it, the lug 68 being pressed against the lug 66 by the operation of the spring 40. This will then cause the sliding valve 26 to cover the openings 31 and the air will be drawn from either of the openings 34, while the opening 29 will be exposed to the atmosphere. This causes the return of the cylinder. The lug 66 immediately engages the lug 68 and so as to hold the lug 68 on the inside of the lug 66. It is thus held until the piston again returns to its first position, whereupon it releases the oscillating member 27 which being again subjected to the tension of the spring 40 causes the oscillating member to swing to the first position. These operations repeat themselves as long as the vacuum pump is operated. The movements of the oscillating member is limited by the ridge 75 which the arm 67 strikes and the stop 71 which side edge of the oscillating member strikes.

The rate of massage operations and the period of such operations is controlled by the needle valve 35, since this controls the suction on the piston 56 and consequently the rate of movement of the sliding valve 13 which controls the massaging formed through the teat-cups is controlled. The parts are so arranged that periods of compression and releasement of the teats will be substantially equal and the rate of the alternations will be controlled by the needle valve 35.

I claim:

1. A pulsator mechanism wherein a pulsator valve is alternated by the reciprocation of a fluid actuted piston, the action of the fluid therein being governed by a control valve reversible as the piston approaches the limit of its stroke in either direction, characterized by a spring arm carried through lateral bodily shifting movement in unison with the piston, the free end of the spring arm having operative engagement with the reversible control valve, to alternately actuate the valve in opposite directions, a stop finger movable to and fro in unison with the piston, a coacting stop lug upon the reversible valve moving to and fro across the path of travel of the stop finger with the movement of the valve, the lug engaging the stop finger upon one side while the piston and spring move in one direction and engaging the stop finger on its opposite side during return movement of the piston and spring arm to prevent reversal of the valve until the piston and spring approach the limit of their movements.

2. A pulsator mechanism wherein a pulsator valve is alternated by the reciprocation of a fluid actuated piston the action of the fluid therein being governed by a control valve reversible as the piston approaches the limit of its stroke in either direction, characterized by a slide member reciprocated to and fro in unison with the piston, a spring arm fixedly mounted upon said slide member in unison with which it is laterally movable and projecting therebeyond with its free end possessing operative engagement with the reversible control valve, and a stop member also movable to and fro with the piston for preventing the movement of the reversible valve first in one direction and then in the other until the piston approaches the limit of its stroke.

3. A pulsator mechanism wherein a pulsator valve is alternated by the reciprocation of a fluid actuated piston, the action of the fluid therein being governed by a control valve reversible as the piston approaches the limit of its stroke in either direction, characterized by a stop member movable to and fro in a substantially straight path of travel in unison with the piston, and a stop lug carried by the reversible valve movable transversely across the straight path of travel of the stop member and engaging said stop member upon one side and then upon the other to prevent reversal of said control valve, until the piston approaches the limit of its stroke and means to actuate the reversible control valve when said lug and stop member are disengaged by the final movement of the piston.

4. In a pulsator mechanism for milking machines and the like, the combination with a pulsator valve, fluid pressure actuated operating means for alternating the same and a reversible control valve for governing the action of the fluid pressure upon said pressure actuated operating means, of a reciprocatory carriage, a spring arm mounted upon the carriage for bodily to and fro movement in a lateral direction, said spring arm having operative engagement with the reversible control valve for intermittently actuating the control valve and means for temporarily holding said control valve against movement until the parts have assumed predetermined relations.

5. A pulsator mechanism for milking apparatus and the like, wherein a pulsator valve is reciprocated by fluid pressure actuated operating means, the action of the fluid pressure upon the operating means being governed by a reversible control valve, characterized by a spring arm, carried by the pulsator valve by the reciprocation of which the arm is laterally shifted to and fro, said spring arm having operative engagement with the control valve and means for temporarily retarding the movement of the valve whereby the spring is tensioned first in one direction and then in the other by the shifting movement of the mounting to actuate the valve into alternate positions when released by the retarding means.

6. A pulsator mechanism for milking apparatus and the like, wherein a pulsator valve is alternated by fluid pressure actuated operating means, the action of the fluid pressure upon the operating means being governed by a reversible control valve, characterized by temporary locking means for the control valve comprising two interengageable members both movable to and fro in substantially transverse paths of travel whereby each member will pass alternately on opposite sides of the other member, said members being interengaging during a portion of their relative movements whereby one member is held against movement until the other member has moved out of its path of travel, one of said members being connected with said valve and the other member being actuated by said fluid pressure means and means for actuating the valve upon the disengagement of said locking members.

7. A pulsator mechanism for milking apparatus and the like, wherein a pulsator valve is alternated by fluid pressure actuated operating means, the action of the fluid pressure upon the operating means being governed by a reversible control valve, characterized by temporary locking means for the control valve comprising two interengageable members, one of which reciprocates in a substantially straight line under the influence of the pressure actuated mechanism, the other of which moves to and fro across the path of travel of the first member in unison with the reversal of the control valve, whereby the first member passes on one side of the second member when traveling in one direction and passes on the opposite side thereof on its return movement, said control valve being held against movement so long as the first member is in the path of movement of the second member, and means for actuating the valve upon the movement of said second member out of such path of travel.

8. A pulsator mechanism for milking apparatus and the like, wherein a pulsator valve is alternated by fluid pressure actuated operating means, the action of the fluid pressure upon the operating means being governed by a reversible control valve, characterized by a pivoted control valve, a reciprocatory slide member, coacting locking members carried by the valve being movable to and fro across the path of reciprocatory movement of the member carried by the slide, said slide member being interposed in the path of movement of the valve member until the pulsator parts approach the end of their cycle of movement whereupon the slide member moves out of the path of the valve carried member releasing the valve and means for actuating the valve to alternate position upon such release.

9. In a milking machine, a pair of conduits, a source of vacuum supply, a sliding valve for alternately connecting the conduits with the atmosphere and with the source of vacuum supply, one of the conduits being connected to the source of vacuum supply while the other is connected with the atmosphere, a fluid pressure means for actuating the valve, a second slide valve operated by the fluid pressure means and for connecting the fluid pressure means alternately with the atmosphere and the source of vacuum supply, an escapement for connecting the fluid pressure means with the second named valve for holding the second named valve in its successive positions until the fluid pressure means has produced each of its operations upon the first named valve.

10. In a milking machine, a source of vacuum supply, a supporting member, a pair of conduits connected to the supporting member, the supporting member having a channel, a sliding valve located in the channel, the channel having openings and the sliding valve having passageways for alternately connecting the conduits with the source of vacuum supply and with the atmosphere, one of the conduits being connected with the source of vacuum supply, while the other of the conduits is connected with the atmosphere, the supporting member having a cylindrical chamber, a piston located in the chamber and connected with the sliding valve, an oscillating member, a sliding valve operated by the oscillating member, the supporting member having passageways connected to the opposite ends of the cylindrical chamber and with the source of vacuum supply, communication between the said passageways being controlled by the second named slide valve, an escapement means interconnecting the piston with the second named sliding valve for maintaining the second named sliding valve in its operative position until the piston has completed its operations upon the first named sliding valve.

11. In a milking machine, a source of vacuum supply, a supporting member, a pair of conduits connected to the supporting member, the supporting member having a channel, a sliding valve located in the channel, the channel having openings and the sliding valve having passageways for alternately connecting the conduits with the source of vacuum supply and with the atmosphere, one of the conduits being connected with the source of vacuum supply, while the other of the conduits is connected with the atmosphere, the supporting member having a cylindrical chamber, a piston located in the chamber and connected with the sliding valve, an oscillating member, a sliding valve operated by the oscillating member, a supporting member having passageways connected to the opposite ends of the cylindrical chamber and with the source of vacuum supply, communication between the said passageways being controlled by the second named slide valve, a pair of lugs, one located on the first named sliding valve and the second located on the oscillating member and so disposed with relation to each other that they will be engaged intermediate the completion of the movements of the first named sliding valve, whereby the second named sliding valve will be held in each operative position until the first named sliding valve has completed its operation.

12. In a pulsator mechanism for milking machines and the like, the combination with a pulsator valve, fluid pressure actuated operating means for alternating the same and a reversible control valve for governing the action of the fluid pressure upon said pressure actuated operating means, of a flexible spring arm having operative connection with the reversible control valve for intermittently actuating the control valve, and means for bodily moving the spring arm laterally, first in one direction and then in the other, whereby the spring arm is flexed and placed under tension by which it tends to exert its reaction influence upon the control valve in the same direction as its tensioning movement, and means for temporarily holding the control valve against movement until the parts have assumed predetermined relations.

In testimony whereof I have hereunto subscribed my name to this specification.

CHARLES O. KENNEDY.